United States Patent [19]

Martin

[11] Patent Number: 4,767,183
[45] Date of Patent: Aug. 30, 1988

[54] HIGH STRENGTH, HEAVY WALLED CABLE CONSTRUCTION

[75] Inventor: Frank E. Martin, Chester, Md.

[73] Assignee: Westinghouse Electric Corp., Pittsburgh, Pa.

[21] Appl. No.: 862,334

[22] Filed: May 12, 1986

[51] Int. Cl.$^4$ .......................... G02B 6/44; H01B 3/00; B05D 5/06; B32B 27/00

[52] U.S. Cl. .............. 350/96.23; 350/96.33; 350/96.34; 428/1; 428/392; 428/394; 427/163; 174/70 R; 174/120 C; 174/120 R

[58] Field of Search .............. 350/96.23, 96.29, 96.30, 350/96.33, 96.34; 428/1, 364, 373, 378, 380, 383, 392, 394; 427/163; 264/1.5, 1.6, 1.7; 174/68 R, 70 R, 70 S, 120 R, 120 C, 120 SR

[56] References Cited

U.S. PATENT DOCUMENTS

| | | | |
|---|---|---|---|
| 2,812,741 | 11/1957 | O'Connor | 427/402 X |
| 3,935,337 | 1/1976 | Taylor | 427/180 |
| 3,944,459 | 3/1976 | Skobel | 156/461 |
| 4,087,575 | 5/1978 | Bichara | 428/1 |
| 4,104,416 | 8/1978 | Parthasarathy et al. | 427/29 |
| 4,161,470 | 7/1979 | Calundann | 528/190 X |
| 4,294,870 | 10/1981 | Hufnagi et al. | 427/189 |
| 4,341,841 | 7/1982 | Ohno et al. | 428/414 |
| 4,344,669 | 8/1982 | Uchida et al. | 350/96.30 |
| 4,384,015 | 5/1983 | Koepke et al. | 427/402 |
| 4,410,683 | 10/1983 | Gale | 528/125 |
| 4,553,815 | 11/1985 | Martin | 350/96.23 |
| 4,624,872 | 11/1986 | Stuetz | 428/1 |

FOREIGN PATENT DOCUMENTS

| | | | |
|---|---|---|---|
| 1189262 | 6/1985 | Canada | 350/96.23 |
| 0091253 | 10/1983 | European Pat. Off. | 350/96.23 |
| 3108109 | 9/1982 | Fed. Rep. of Germany | 350/96.23 X |
| 56-167108 | 12/1981 | Japan | 350/96.34 |
| 61-91610 | 5/1986 | Japan | 350/96.23 |
| 1371740 | 10/1974 | United Kingdom | 350/96.10 X |
| 1538853 | 1/1979 | United Kingdom | 350/96.23 X |

OTHER PUBLICATIONS

Shuto et al., "Fibre Strain Induced During Heat Cycle in Liquid-Crystal . . . " Elect. Lett. 9/84, vol. 20, No. 20, pp. 841-842.

*Primary Examiner*—William L. Sikes
*Assistant Examiner*—Brian M. Healy
*Attorney, Agent, or Firm*—D. Schron

[57] ABSTRACT

An optical fiber is surrounded by a protective cladding of a liquid crystal material and fabricated by passing the optical fiber through a die member which operates to deposit relatively thin individual high-strength layers built up to a desired thickness. In another embodiment, the desired thickness is achieved by surrounding the optical fiber or fibers with a plurality of individual high-strength strands of liquid crystal polymer collectively compressed about the optical fiber(s).

7 Claims, 8 Drawing Sheets

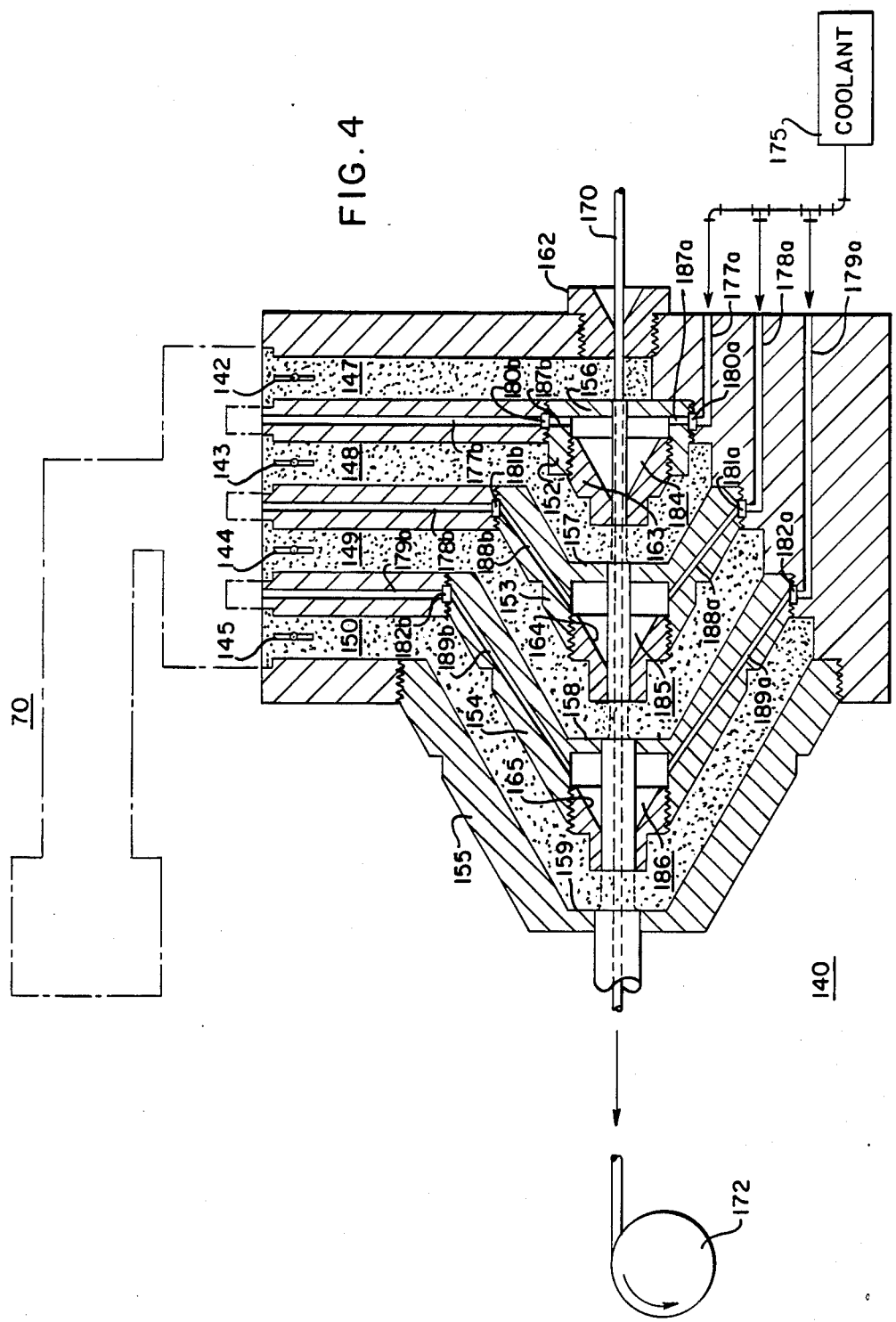

HIGH STRENGTH, HEAVY WALLED CABLE CONSTRUCTION

BACKGROUND OF THE INVENTION

1. Field of the Invention

The invention in general relates to cables having one or more central energy conducting members and particularly to a cable having one or more light energy conducting optical fibers, suitably protected for ruggedized use.

2. Description of the Prior Art

In U.S. Pat. No. 4,553,815 there is described an optical fiber cable construction wherein an optical fiber, preferably surrounded by a low modulus buffer material such as silicone resin, is encased in a liquid crystal polymer protective cladding. The liquid crystal polymer is of the type which is thermoplastic and forms rigid, rod-like molecular aggregates in an overlapping, orientable fashion, at some point in its melt cycle. The buffered optical fiber is placed in a die member of an extruding machine having a conical chamber into which is introduced the liquid crystal polymer material. As the optical fiber is pulled through the die, the liquid crystal polymer is deposited as an annulus which is drawn down over and onto the fiber with the construction and operation being such as to promote orientation of the rod-like molecular aggregates which function as the polymer's self-contained reinforcing elements.

The resulting cable construction provides for a rugged optical fiber cable having high abrasion, impact and rupture resistance with a very high tensile strength normally provided by a fiber impregnated resin coating, however, at a fraction of the thickness so that relatively small diameter spools or drums may be used for storage and deployment of the optical fiber cable.

Maximum orientation of the liquid crystal polymer is typically achieved with wall thicknesses no greater than approximately 0.02 to 0.03 inches. Under some various adverse environmental conditions, a thicker more protective coating would be desirable such as for use as above ground transmission lines where the cable might be strung on poles. If the extruding machine process is modified to deposit the desired thicker coating on the optical fiber, the resulting cable would be subject to a loss of material strength since the polymer would not have the same orientation achievable with the thinner coating. It is believed that this is due to a greater opportunity for turbulent melt mixing of the polymer and reduced shear process.

The present invention provides for a cable construction having an outer liquid crystal polymer jacketing material of a much greater thickness than the 0.02 to 0.03 inch maximum achievable with the construction described in the aforementioned patent, while still maintaining the desired orientation of the molecular aggregates so as to define a high strength cable arrangement.

SUMMARY OF THE INVENTION

A high-strength protected cable in accordance with the present invention includes one or more members operable to conduct energy, a preferred example of which is an optical fiber cushioned by an elastomeric layer. An outer protective jacket is provided for the conductor or conductors and is a liquid crystal polymer of the type which is thermoplastic and which forms rigid rod-like molecular aggregates in an overlapping orientable fashion at a point in its melt cycle. The jacket is formed of a plurality of individual oriented thin concentric layers or, in another embodiment, a plurality of thin strands which collectively surround the core member. Each of the concentric layers or strands is individually oriented and built up to a desired thickness to result in an extremely rugged protected cable.

BRIEF DESCRIPTION OF THE DRAWINGS

FIG. 4 is a cross sectional view of another embodiment of the present invention;

DESCRIPTION OF THE PREFERRED EMBODIMENTS

Figure 1:
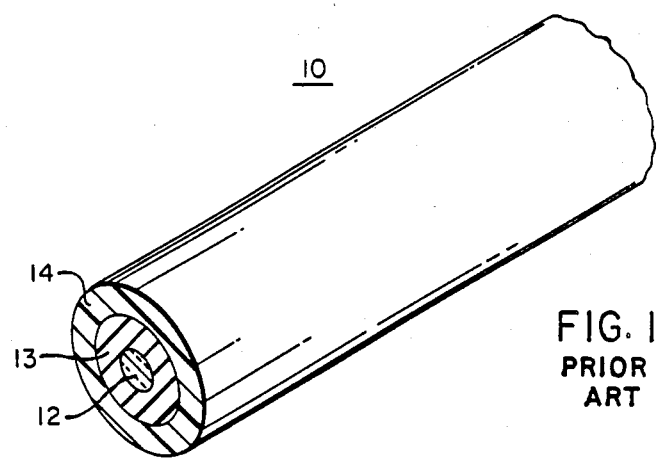
FIG. 1 illustrates one example of a prior art optical fiber cable jacketed with a liquid crystal polymer.

Referring now to FIG. 1 there is illustrated on optical fiber cable 10 of the prior art such as described in U.S. Pat. No. 4,453,815, hereby incorporated by reference. Cable 10 includes an optical fiber core 12 as well as an elastomeric buffer material 13 such as room temperature vulcanized silicone rubber, for cushioning the core. Cable 10 further includes a protective cladding 14 of a liquid cyrstal polymer formulation resulting in a jacket with extremely high mechanical strength imparting to the cable a tensile strength to elongation ratio in excess of one million psi, while still maintaining sufficient flexibility so that the cable may be wound around a relatively small diameter spool.

A typical wall thickness of the liquid crystal polymer jacket 14 is in the order of 0.02 to 0.03 inches. A cable with a thicker coating would require a larger diameter spool but, more importantly, would decrease the tensile strength of the resulting cable. There are instances however, such as for rugged outdoor use where a thicker jacket would be desirable to protect against the elements as well as rough handling. Although the provision of larger diameter spools is no drawback, the resulting optical fiber cable, although smaller than conventional armored cable would not be as proportionately strong as its thin walled counterpart. An optical fiber cable having the desired attributes of a relatively thick protective wall with high strength is provided in accordance with the teachings of the present invention, one example of which is illustrated in FIG. 2 to which reference is now made.

Figure 3:
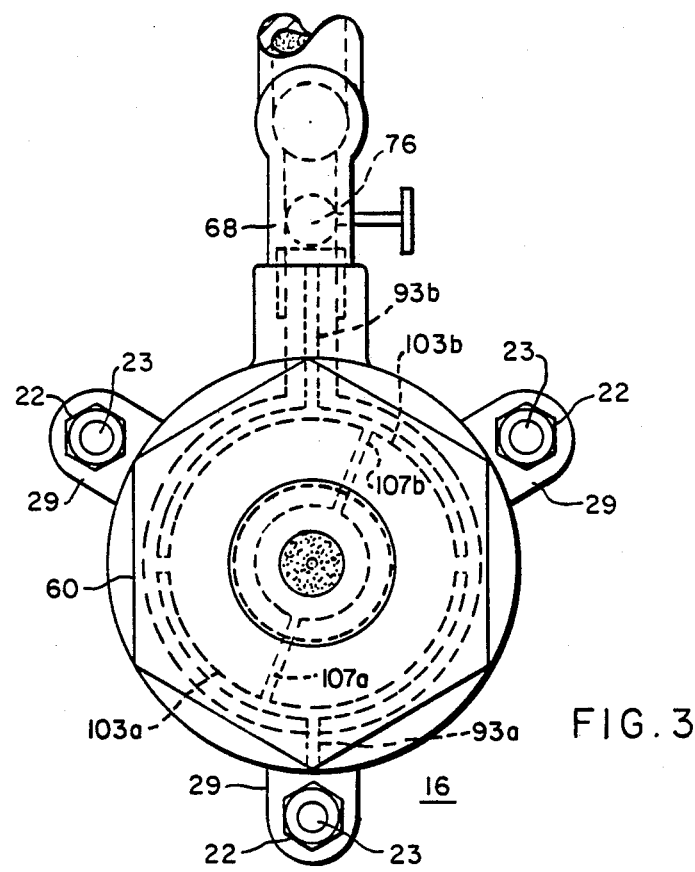
FIG. 3 is an end view of the apparatus of FIG. 2.
Figure 2:
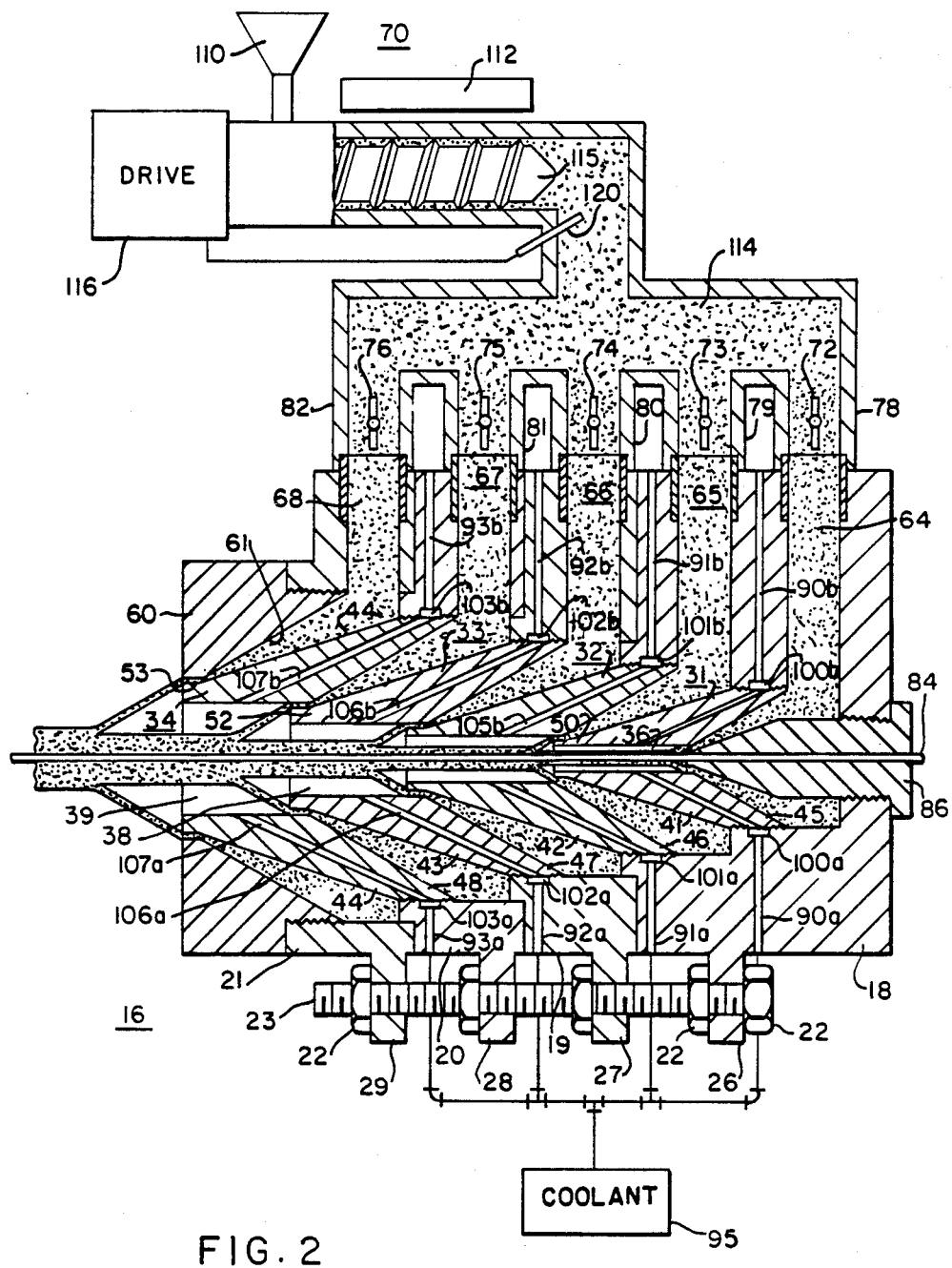
FIG. 2 is a cross sectional view of one embodiment of the present invention.

FIG. 2 illustrates a multi-section die member 16 made up of a plurality of die sections of which four, 18–21 are illustrated by way of example. Each die section 19–21 is slipped over a previous die section 18–20, respectively, with the die sections being maintained in position by means of nuts and bolts 22, 23, Bolts 23 (three are shown in FIG. 3) pass through apertures in ears 26–29 integral with respective die sections 18–21.

This sectional approach is provided for ease of access to successive stages of the process to be described as they are brought on-line. These sections, alternatively, could be combined in a single, unitized block without departing from the scope of the invention.

Either arrangement would include a plurality of progressively larger components 31-34 threadedly engaged with various ones of the die sections. Thus in FIG. 2, components 31 and 32 are connected to die section 18, component 33 is connected to die section 19 while component 34 is connected to die section 20. The components includes progressively larger diameter central or axial bores 36-39 as well as respective outer polished conical surfaces 41-44 and inner polished conical surfaces 45-48. The free ends of the outer polished conical surfaces terminate in respective cylindrical land portions 50-53 and end component 60 is threadedly engaged with die section 21 and includes a single inner polished conical surface 61.

The die sections includes passageways 64-68 which contain molten liquid crystal polymer such as that described in the referenced patent and provided by a single extrusion machine 70 by selective operation of valves 72-76 in the individual delivery ducts 78-82.

As illustrated in FIG. 2, an optical fiber 84 to be given a thick coating of liquid crystal polymer passes through a boss or bushing 86, through the successively larger axial bores 36-39 and thereafter the coated fiber is wound upon a take up reel (not illustrated). Although the process is described by way of example with respect to an optical fiber which may have an elastomeric cushion, it is to be understood that the process is applicable to any energy conducting member to be given a thick coating of liquid crystal polymer resulting in a protective cladding which is equivalent in strength to conventional armored cable but of a much smaller diameter.

After emerging from bushing 86, the optical fiber 84 receives a first relatively thin coating of the molten liquid crystal polymer in passageway 64. Since the liquid crystal polymer is of the type which is thermoplastic and which forms rigid rod-like molecular aggregates in an overlapping orientable fashion, the orientation of the molecular structure of the liquid crystal polymer is promoted not only by shear forces as the polymer exits the passageway but by the extensional forces produced in draw down of the annular tube of material onto the much smaller optical fiber strand. After passage through axial bore 36, a second relatively thin coating of liquid crystal polymer is deposited on the already first coated section with the second deposition being provided by molten liquid polymer emanating from passageway 65 and passing over cylindrical land portion 50.

The same deposition process of a relatively thin coating of liquid crystal polymer is repeated subsequent to land portions 51, 52 and 53 by molten liquid crystal polymer from passageway 66, 67 and 68.

After deposition of each relatively thin coating of liquid crystal polymer the orientation of the polymer must be fixed or set so as to maintain its desired strength properties. This may be accomplished with adequate spacing between depositions. As an alternative, means may be provided for cooling each deposited liquid crystal polymer layer prior to a subsequent deposition. To this end, die sections 18-20 are provided with coolant passageways 90a-93a connected to a source of cooling fluid 95. The cooling fluid may be provided either in a liquid or gaseous state, Freon being one example.

The coolant passageways 90a-93a terminate in, or connect with, respective semicircular grooves 100a-103a. Each of the threadedly engaged members 31-34 includes a coolant passageway 104a-107a respectively, which function to conduct the cooling fluid to the outer surface of a deposited liquid crystal polymer layer and to the under surface of the conical melt after emergence from the annular apertures formed by land portions 50-53.

Discharge of the cooling fluid to the ambient atmosphere or to recirculating equipment is accomplished by counterpart fluid passageways 104b-107b in members 41-44, respective semicircular grooves 100b-103b and die coolant passageways 90b-93b. With this arrangement, the components 41-44 may be threadedly engaged with the die sections and, as long as passageways 104a,b-107a,b are lined up with the respective semicircular grooves, coolant flow will be insured. There would be a small segment at the 3 o'clock and 9 o'clock positions, such as viewed in FIG. 3, where coolant flow would be blocked. This orientation may be prevented by placing an appropriate marking on a section to insure that the proper alignment is accomplished. For ease of viewing, FIG. 3 only shows a one fluid circuit including coolant passageways 93a, 103a, 107a, 107b, 103b and 93b. Additionally, passageways 104a,b-107a,b are illustrated as being in the plane of the drawing of FIG. 2 whereas these passageways would in all probability be radially displaced from one another as would be viewed in FIG. 3.

Use of a recirculating coolant system would require a pump to draw off the injected coolant and the draw off rate could be adjusted to establish a slight negative pressure differential across the last conical melt to aid in further stabilization and deposition.

When commencing the coating operation, valves 72-76 may be in a closed condition while the optical fiber 84 is passed through the die structure and onto the take up reel. Liquid crystal polymer such as described in the aforementioned patent may be introduced, in powdered or pelletized form into hopper 110 after which it is converted to liquid form by means of heaters 112 and delivered to manifold 114 by means of screw feeder 115 operated by drive mechanism 116.

When the liquid crystal polymer is ready for deposition, valve 72 may be opened initiating deposition of a first liquid crystal polymer layer on the optical fiber and once operating conditions for this first stage of deposition have been stabilized, valve 73 may be opened and the process continued until all five thin layered depositions have taken place.

Opening of the second stage and subsequent valves would tend to lower the pressure of the liquid crystal polymer in the manifold 114. In order to have each liquid crystal polymer layer depositioned at the same pressure, the arrangement includes a pressure sensor 120 positioned within manifold 114 and operable to provide an output signal indicative of the pressure therein. This pressure signal is provided to drive mechanism 116 to vary the drive speed of screw feeder 115 proportionally. Accordingly the extruder functions to maintain the same melt pressure independent of the number of downstream valves that are opened.

FIG. 4 illustrates an embodiment wherein a die member 140 includes a plurality of internally threaded members to provide for sequential stages of pressure die extrusion wherein the orientation of the liquid crystal polymer is established solely by shear forces as the coated optical fiber is pulled through progressively larger orifices, with no allowance for extensional orientation.

In FIG. 4 valves 142-145 control the admission of liquid crystal polymer into passageways 147-150. The liquid crystal polymer supply may be the same as that illustrated in FIG. 2.

Die member 140 includes a plurality of internally threaded portions which engage components 152-155, each of which components includes a respective orifice plate portion 156-159, with the orifices progressively increasing in size. The arrangement by way of example includes four bushings 162-165, with bushing 162 being threadedly engaged in the outside of die member 140 and the remainder of the bushings being threadedly engaged with respective components 152-154. The central apertures in the bushings are, like the orifice plate portions, of progressively increasing diameter.

Optical fiber 170, or any other energy conducting member passes through the arrangement and is wound upon take up reel 172. As the optical fiber 170 emerges from bushing 162, it is immersed in the liquid crystal polymer within passageway 147. As the optical fiber is drawn through the arrangement, a relatively thin liquid crystal polymer coating is applied with the thickness thereof being determined by the aperture in orifice plate portion 156. As the coated optical fiber emerges from subsequent bushings, it encounters subsequent liquid crystal polymer deposition stages each of which applies a thin liquid crystal polymer jacketing to the previously deposited material, thus building up a desired thickness in layers wherein the molecular aggregates are oriented by shear forces as the arrangement passes through the orifices.

As was the case with respect to FIG. 2, the arrangement of FIG. 4 also provides for the cooling of a deposited layer prior to the deposition of a subsequent layer. The cooling arrangement is similar to that illustrated in FIG. 2 in that a source of coolant fluid 175 provides Freon, or the like, to a plurality of coolant passageways 177a-179a. The coolant passageways terminate in respective semicircular grooves 180a-182a, best seen in FIG. 5. The cooling fluid enters chambers 184-186 via respective passageways 187a-189a defined in respective members 152-154. After cooling the deposited liquid crystal polymer coating, the cooling fluid exits via passageways 187b-189b, semicircular grooves 180b-182b and passageways 177b-179b.

Figure 5:
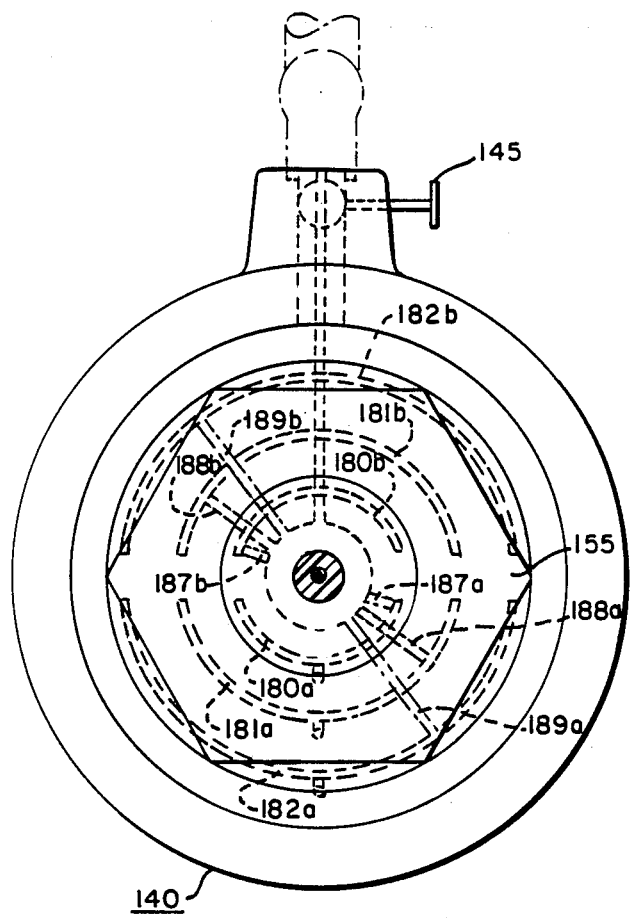
FIG. 5 is an end view of the apparatus of FIG. 4.

As was the case with respect to FIGS. 2 and 3, coolant passages 187a,b-189a,b are shown in the plane of the drawing of FIG. 4 whereas they are radially displaced from one another in FIG. 5.

Thus with the die arrangements of FIGS. 2 and 4, an optical fiber, or any other energy conducting member, may be given multiple thin coats of liquid crystal polymer properly oriented so as to result in a thick protective coating having a much higher tensile strength than a comparable arrangement wherein the thick coating is deposited in one step. The arrangement utilizes a single liquid crystal polymer supply connected to multiple passages in the die arrangement and the single pass operation significantly reduces the opportunity for any strand contamination that might occur in a multiple pass operation. Further, with the single pass arrangement, only a single take up operation is required.

The fabricated cable resulting from the procedures illustrated in FIGS. 2 and 4 has a central energy conducting member contacted and surrounded by a relatively thick illustrated crystal polymer jacket made up of a plurality of concentric relatively thin sheaths each contributing a certain strength to the overall cable.

FIGS. 6-11 illustrate other embodiments of the invention wherein an energy conductor is surrounded by a relatively thick liquid crystal polymer jacketing made up of a plurality of individual strands which collectively surround the conductor and which individually have a relatively high strength.

Figure 6:
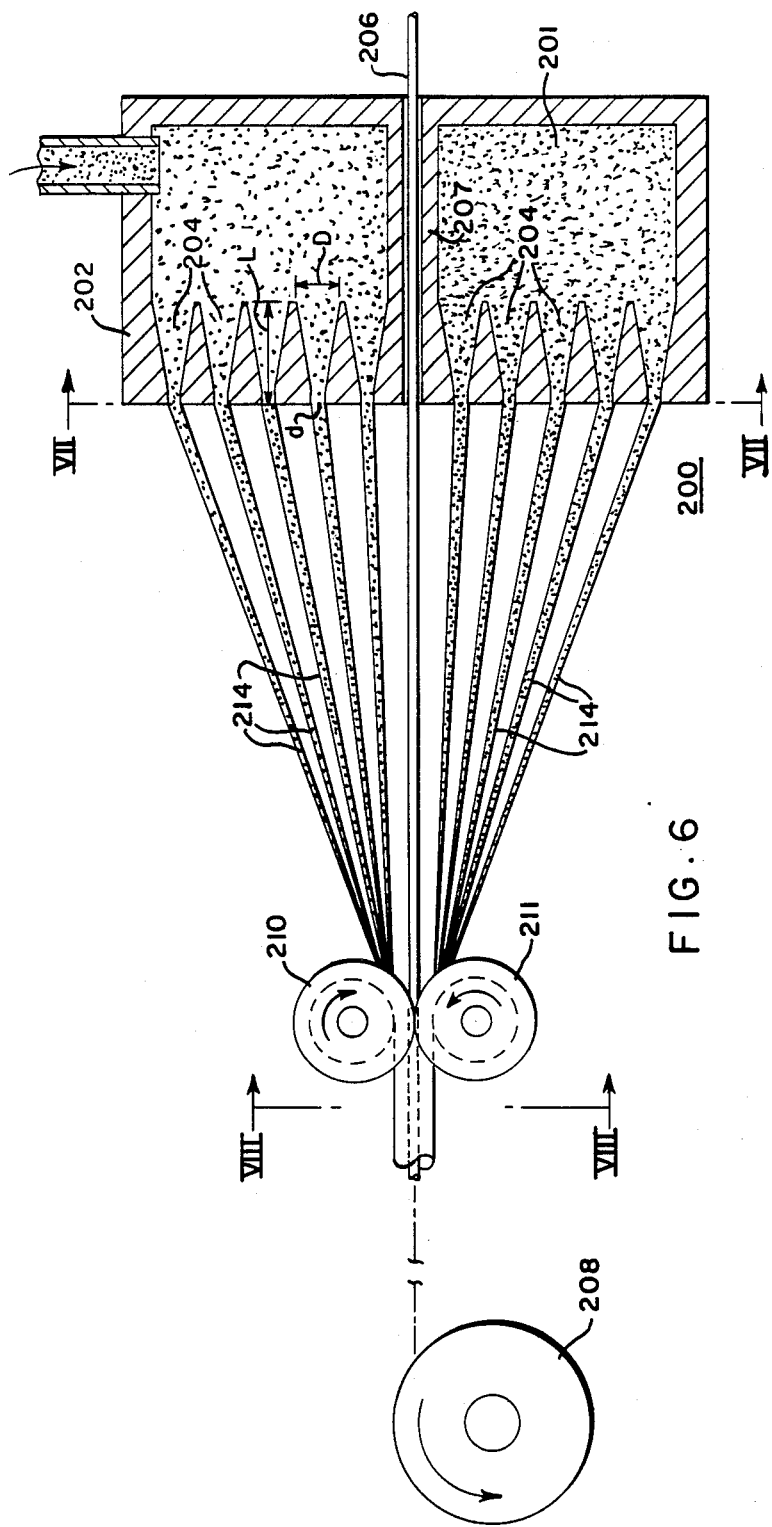
FIG. 6 is a cross sectional schematic view of another embodiment of the present invention.
Figure 7:
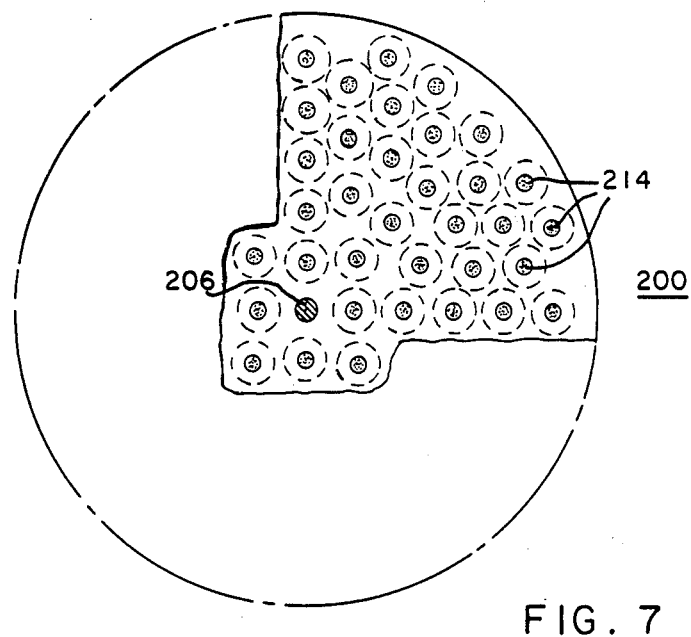
FIG. 7 is a view along line VII—VII of FIG. 6.
Figure 8:
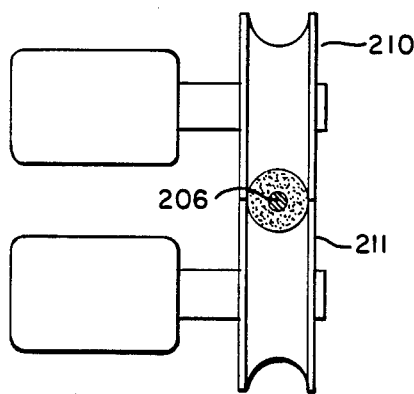
FIG. 8 is a view along line VIII—VIII of FIG. 6.

FIG. 6 illustrates one example which includes a die member 200 having an internal cavity 201 for receipt of liquid crystal polymer under pressure from an extruder. Die member 200 includes a multi-orifice die plate 202 having a plurality of orifices 204 each being of a generally conical shape. Each orifice has an entrance diameter D and an exit diameter d with an overall length of 1. In a typical operation, the diameter reduction in orifice entrance to exit may, by way of example, be in the order of 4:1 and the ratio of orifice length to entrance diameter may be in the order of 3.5:1, that is D/d=4 and 1/D=3.5.

An optical fiber 206, or other member to be coated, is fed through a central passageway 207 in the die member and is wound upon a taken up reel 208 after passage through motor driven nip rollers 210 and 211. The individual strands 214 of liquid crystal polymer emanating from the multi-orifice die plate 202 collectively surround, and are symmetrically disposed about, the optical fiber 206 and have their molecular aggregates oriented to impart high strength. After exiting from the die member, the individual strands are in a somewhat plastic or tacky state and are compressed into a single void free diameter jacketing by action of the nip rollers 210 and 211. As viewed in FIG. 7, a typical construction may include the provision for over 100 individual strands which, in one embodiment, would essentially be parallel to the optical fiber in the completed cable.

The molecular aggregates of the liquid crystal polymer individual strands 214 are oriented by extension accomplished by having the pull rate of the nip rollers and take up reel faster than the individual strand emergence from the die.

Figure 9:
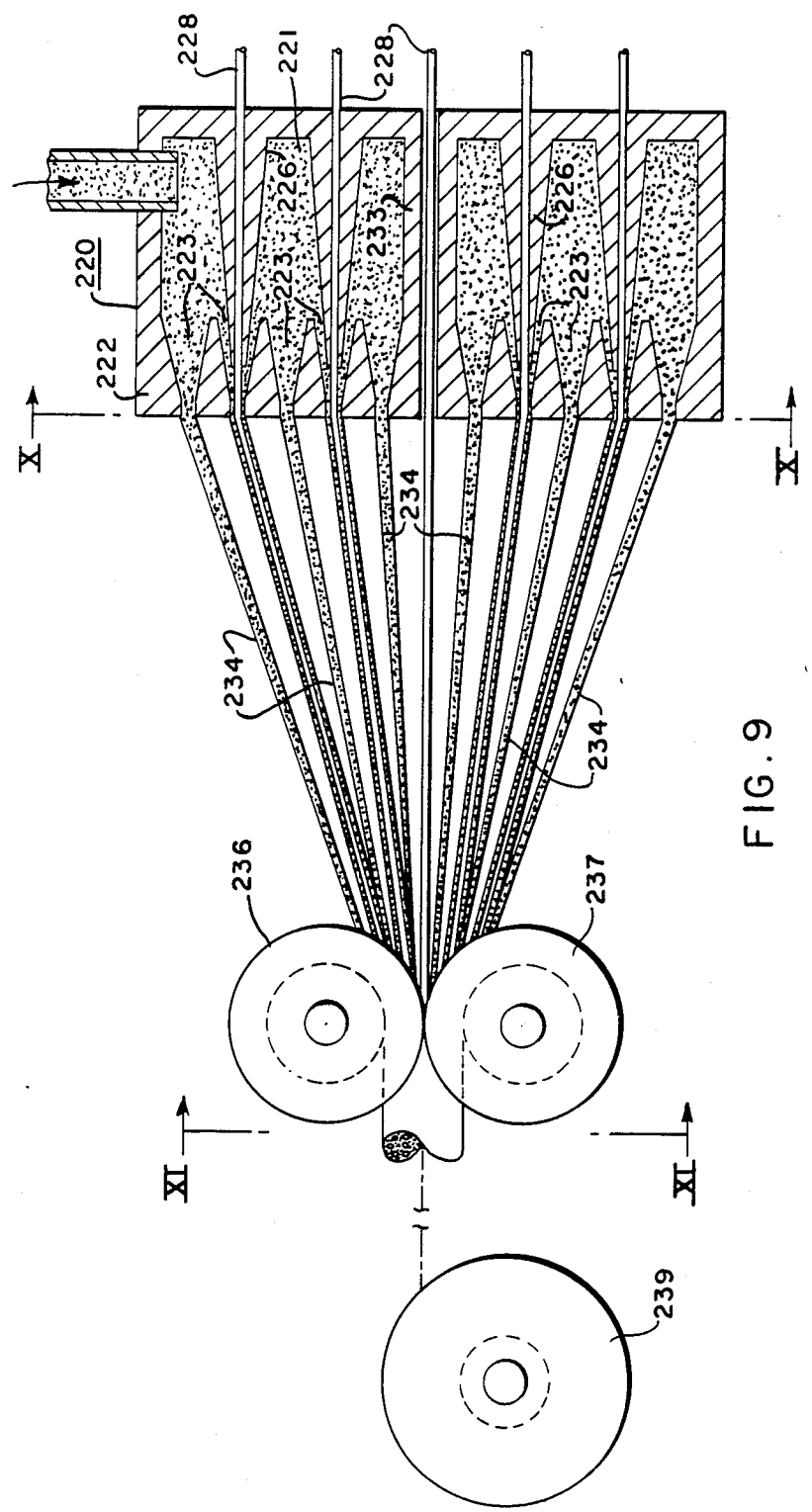
FIG. 9 is a cross sectional schematic view through another embodiment of the present invention.
Figure 10:
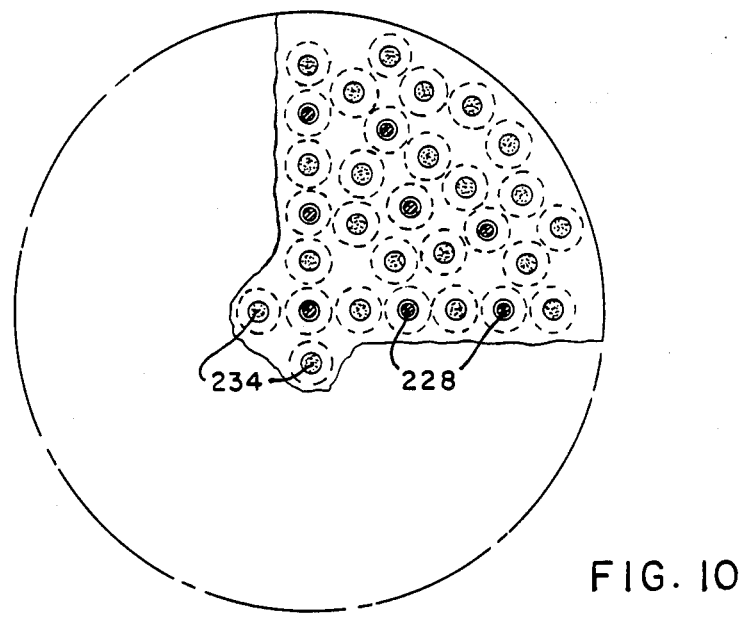
FIG. 10 is a view along line X—X of FIG. 9.
Figure 11:
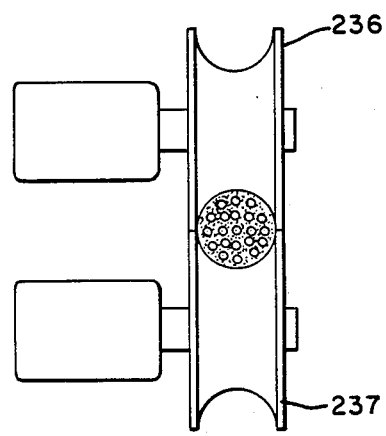
FIG. 11 is a view along line XI—XI of FIG. 9.

FIGS. 9-11 illustrate the fabrication of a multiconductor cable utilizing apparatus somewhat similar to that shown in FIG. 6. For the multicable construction, there is provided a die member 220 having an internal cavity 221 for receipt of liquid crystal polymer under pressure. The die member includes a multi-orifice die plate 222 having conical orifices 223. In addition, the die member is provided with a plurality of conical nozzles 226 which project into selected ones of the conical orifices 223.

Optical fibers 228 pass through central apertures in the nozzles 226 and emerge at the exit of selected orifices 223, with each being coated by an individual strand of oriented liquid crystal polymer. A central optical fiber passes through a central passageway 233 of the die member and is coated as in FIG. 6. The individual strands 234 as well as the coated optical fibers are collectively formed into a unitary structure by action of motor drive nip rollers 236 and 237 with the final product being wound upon take up reel 239. As an alternative, each of the optical fibers may be given an independent passageway through the die member to be coated in a manner similar to the central optical fiber.

FIG. 10 illustrates a view along line X—X of FIG. 9 and by way of example one central fiber and 20 peripheral fibers are coated and surrounded by liquid crystal polymer strands emanating from over 100 orifices.

The cable produced by the apparatus thus far described is extremely rugged and exhibits a high mechanical strength equivalent to a typical armored cable of much larger diameter. In some instances, a user may want to color code the cable or provide for an enhanced surface appearance. This may be accomplished by providing an outer covering to the cable of a conventional thermoplastic material, which would additionally assist in preventing any defibrillation of the hardened liquid crystal polymer.

The deposition of this conventional thermoplastic may be accomplished in line, just after formation of the cable. Alternatively, with a slight modification, the last passageway 68 (FIG. 2) or 150 (FIG. 4) may be provided with the conventional thermoplastic material instead of the liquid crystal polymer so that the cable is provided with the outer jacket as it emerges from the die member.

What is claimed is:

1. A high strength protected cable comprising:
   (A) an elongated core member for conduction of energy;
   (B) an outer protective jacket for said core member;
   (C) said outer protective jacket being of a liquid crystal polymer of the type which is thermoplastic and which forms rigid rod-like molecular aggregates in an overlapping orientable fashion at a point in its melt cycle, said rod-like aggregates being oriented in the direction of elongation of said core member;
   (D) said protective jacket being formed of a plurality of individual layers of said liquid crystal polymer collectively surrounding said core member to a desired thickness.

2. Apparatus according to claim 1 wherein:
   (A) said core member is an optical fiber.

3. Apparatus according to claim 2 wherein:
   (A) said optical fiber includes a surrounding elastomeric buffer.

4. Apparatus according to claim 1 wherein:
   (A) said layers are constituted by successively deposited concentric sheaths.

5. Apparatus according to claim 1 wherein:
   (A) said layers are constituted by strands compressed about said core member in an essentially void-free manner.

6. Apparatus according to claim 5 wherein:
   (A) said strands are parallel to one another and to said core member.

7. Apparatus according to claim 1 which includes:
   (A) a plurality of said core members surrounded by said protective jacket.

* * * * *